Jan. 19, 1932.　　　C. H. KIRBY　　　1,841,740
HEATER CONSTRUCTION FOR INTAKE MANIFOLDS
Filed May 1, 1926　　3 Sheets-Sheet 1
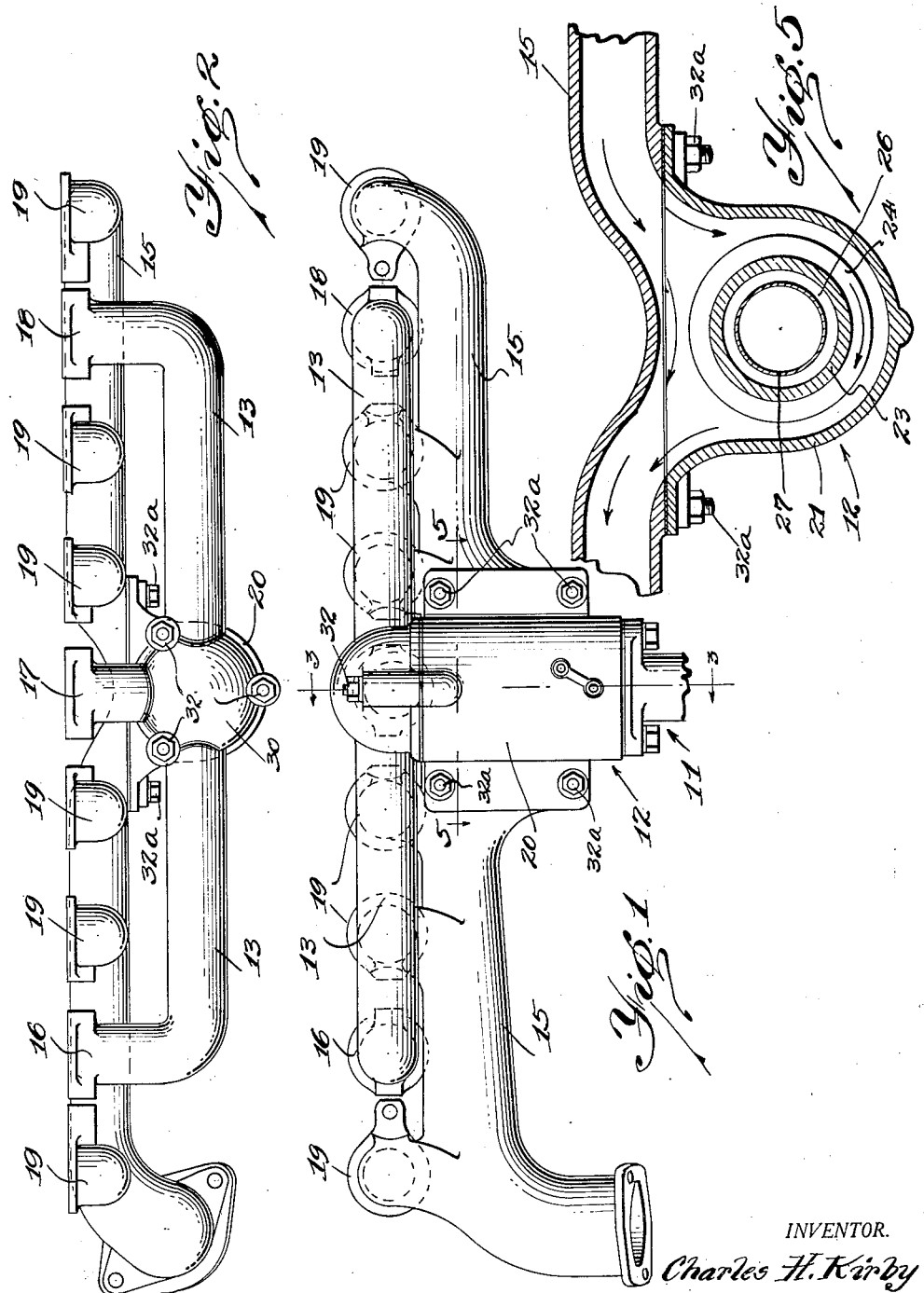
INVENTOR.
Charles H. Kirby
BY
ATTORNEYS.

Jan. 19, 1932.　　　　C. H. KIRBY　　　　1,841,740
HEATER CONSTRUCTION FOR INTAKE MANIFOLDS
Filed May 1, 1926　　　3 Sheets-Sheet 2
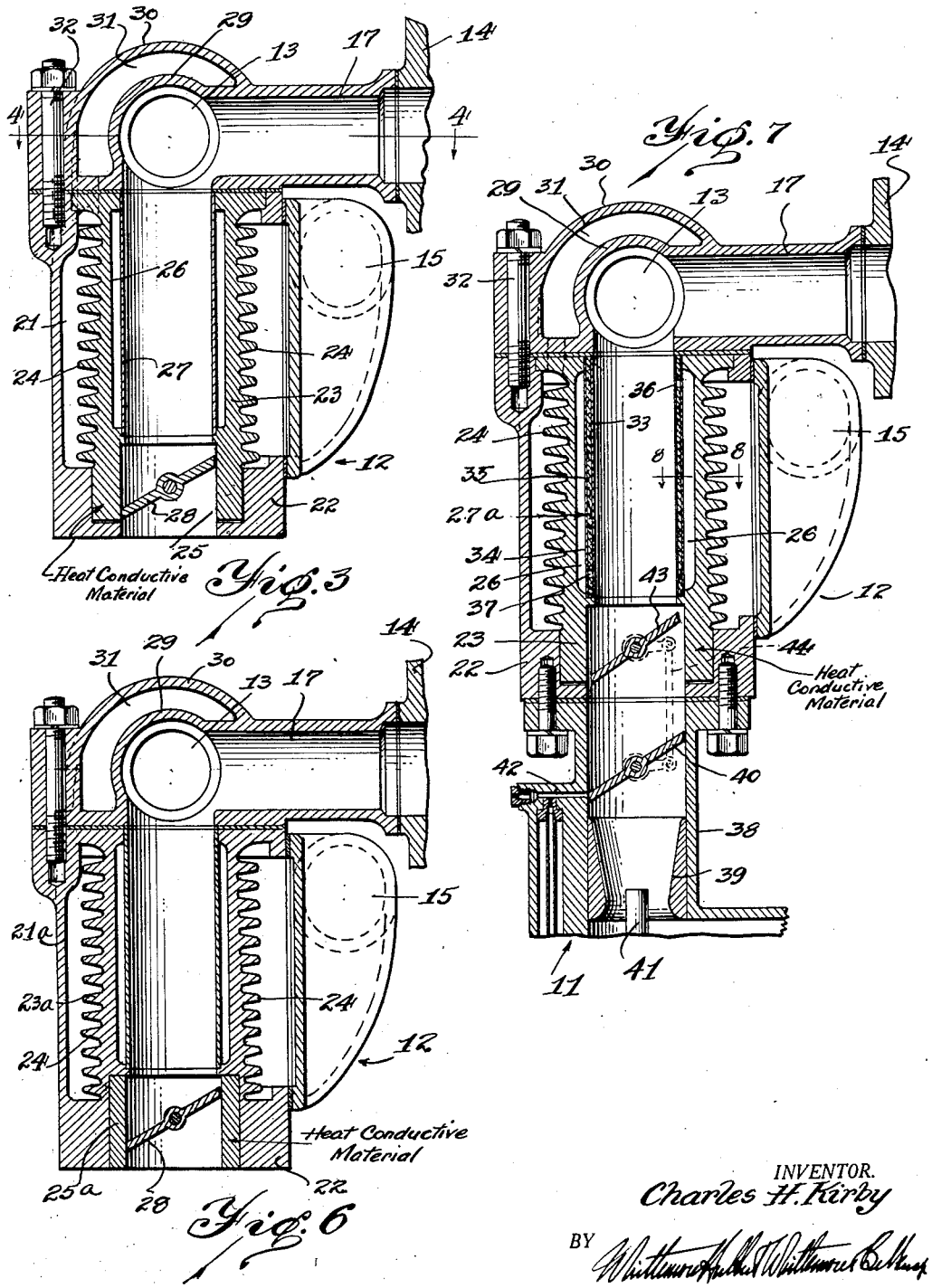
INVENTOR.
Charles H. Kirby
BY
ATTORNEYS.

Jan. 19, 1932. C. H. KIRBY 1,841,740
HEATER CONSTRUCTION FOR INTAKE MANIFOLDS
Filed May 1, 1926 3 Sheets-Sheet 3
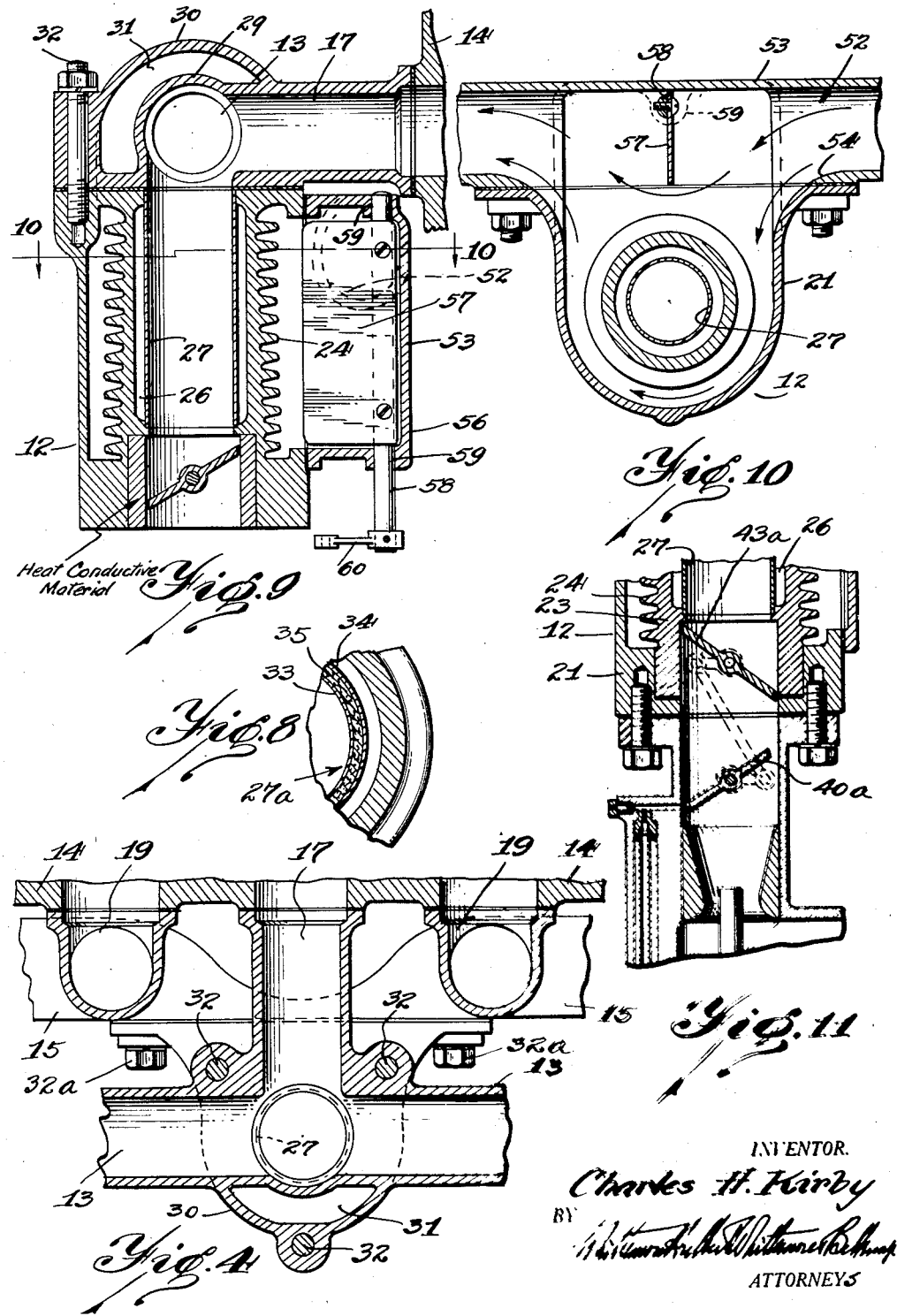

Patented Jan. 19, 1932

1,841,740

UNITED STATES PATENT OFFICE

CHARLES H. KIRBY, OF DETROIT, MICHIGAN, ASSIGNOR TO MARVEL CARBURETER COMPANY, OF FLINT, MICHIGAN, A CORPORATION OF ILLINOIS

HEATER CONSTRUCTION FOR INTAKE MANIFOLDS

Application filed May 1, 1926. Serial No. 106,023.

The invention relates to the automatic heat regulation of the explosive charge passing to an internal combustion engine.

One of the objects of the invention is to provide a construction in which the heating of the explosive charge is automatically varied at different engine speeds without requiring movable valves to control the heating fluid.

Another object is to provide an intake manifold with a heating jacket surrounding the same, in which means is provided for heating a limited portion of the intake manifold to a much higher temperature than the remaining portions.

Another object is to provide a heat collector having an extended area thereof exposed to the heating fluid and a limited area in contact with the explosive charge.

A further object resides in the provision in a heating chamber around an intake conduit, of a member of high thermal conductivity arranged to absorb the heat from said chamber and conduct the same to a relatively limited area of the intake conduit, said member being also arranged to maintain other portions of the conduit at a lower temperature.

Another object is to secure a heated manifold in which controllable means is provided for deflecting or directing the liquid fuel against surfaces brought to high temperatures in which heated surfaces are provided wherever a change of direction in the manifold occurs so as to vaporize the liquid fuel thrown into contact therewith by reason of its inertia and in which additional means is provided to prevent or retard a rise in temperature of the whole mixture in any section of the conduit where there is no provision or natural tendency to direct the liquid portions against the walls of the conduit.

It is desirable to protect as far as possible the straight line sections of the mixture conduit against high temperatures, because of the fact that in such instances the line of communication of the heat to the liquid fuel is largely through the medium of the air, inasmuch as the volume of air is always much greater than that of the liquid fuel, by a ratio, (expressed in terms of pounds) of 10 to 1 up to 16 to 1 or thereabouts.

The liquid fuel is the element in the mixture which it is desired to vaporize and retain in this highly volatile state, first as an aid to uniform distribution with the air en-route to the combustion chamber, and second, to facilitate the ignition and complete combustion of the fuel in the combustion chamber of the engine. Excessive heating of the air causes an expansion of same that tends to lower the volumetric efficiency of the engine in the range of full open, or approximately full open throttle operation.

The ill effects mentioned vary somewhat with the difference in design and cross section area of the suction conduit. During part throttle operation it is possible to permit higher mixture temperatures without introducing this loss in volumetric efficiency, owing to the fact that the intake conduit is designed to accommodate the maximum requirements of the engine, and if this expansion is held within the limits of the conduit capacity a loss of volumetric efficiency will be avoided.

Other objects of the invention will be more apparent after considering the detailed description of the various modifications of my invention as hereinafter set forth:

In the drawings:

Figure 1 is a side elevation of a manifold construction for an internal combustion engine.

Figure 2 is a top plan view thereof.

Figure 3 is a vertical section through the heater on the line 3—3 of Figure 1.

Figure 4 is a horizontal section on the line 4—4 of Figure 3.

Figure 5 is another section on the line 5—5 of Figure 1.

Figure 6 is a view similar to Figure 3, showing a slightly modified construction.

Figure 7 is another modified arrangement.

Figure 8 is a partial cross section on the line 8—8 of Figure 7.

Figure 9 is a vertical section through a heater showing a modified arrangement for introducing the exhaust gases thereinto.

Figure 10 is a cross section on the line 10—10 of Figure 9.

Figure 11 illustrates a modified arrangement for connecting the deflector in the heated section to the throttle of the carburetor.

Referring first to the manifold construction as illustrated in Figures 1 to 5, 11 is the carburetor, 12 a riser section above the carburetor, 13 the portion of the intake manifold leading from the riser section to the engine 14, and 15 is the exhaust manifold. The intake manifold 13 is shown as being provided with the three branch conduits 16, 17 and 18, leading to the engine block of a six cylinder motor in the conventional manner. The exhaust manifold 15 has the main portion thereof arranged slightly below the intake manifold and has the branch conduits 19 leading from the engine block in the usual manner. The central portion of the exhaust manifold 15 is enlarged at 20 to surround the intake manifold in the riser section 12 and form a heating chamber 21. Thus as shown, the exhaust products from the three right hand cylinders of the engine are led through the heating chambers 21 before being combined with the products from the three left hand cylinders and escaping through the usual outlet conduit.

The riser section 12 has an outer jacket 22 in which is inserted a tubular member 23, and the outer surface of which is formed with a series of fins 24 to provide a large area in contact with the heating fluid in the chamber 21. The member 23 has a passageway 25 therein forming a portion of the intake conduit and has an annular recess 26 of larger diameter than the conduit 25. 27 is a tube within the tubular member 23 and spaced from the same by the recess 26. A butterfly valve 28 is arranged in the portion 25 of the member 23 and in the embodiment of the invention illustrated in Figures 1 to 6, this valve forms the throttle for controlling the mixture supplied to the engine, there being no other throttle in the carbureter 11.

Above the riser section 12 is a separate lateral section 29 which includes the three branch conduits 16, 17 and 18. This lateral section is provided with an integral dome 30 forming a heating chamber 31 around the portion of the intake passage where the change in direction from vertical to horizontal occurs and the chamber is open at the bottom to provide communication with the heating chamber 21 in the riser section and permit the exhaust gases in the latter to ascend into the dome. The lateral section is secured to the riser section by studs or bolts 32 while the intake manifold is secured to the exhaust manifold by studs or bolts 32ª.

The purpose of the member 23 is to absorb heat from exhaust gases in the heating chamber and convey the same to the portion 25 which is exposed to the mixture passing upwardly through the riser section. This member is therefore preferably formed of a material having a high thermal conductivity such as copper or aluminum in order that the portion 25 will have the characteristic of taking up heat very quickly and rapidly conducting the same to points where it will be available for vaporizing the fuel. The tube 27, however, is spaced from the heat collector 23 so as to greatly reduce the thermal activity thereto from said member, thereby maintaining the temperature of the tube 27 substantially lower than the portion 25.

The effect of this arrangement in the operation of the engine is as follows: When the throttle 28 is closed or nearly closed and the engine consequently idling, the explosive charge is deflected by said throttle into direct contact with the heated portion 25 and is heated sufficiently to vaporize the fuel. At the higher engine speeds the throttle is open wider and a greater volume of mixture flows through the conduit and because of the limited extent of the heated surface 25, the heating effect on the mixture is less. When the throttle is wide open, a very limited heating of the mixture takes place at this point. I have found that by properly predetermining the amount of surface exposed to the stream of fuel mixture, it is possible to obtain a mixture heated to the desired amount for high efficiency under all conditions of operation. It is preferable, however, to have heating chambers arranged at any bend of the intake conduit, so that heavy fractions of the fuel which are thrown out by inertia will strike the heated walls and be reintroduced into the explosive stream.

From the above, it will be apparent that my method for automatically regulating the heating of the explosive charge is to pass the charge through a conduit having one portion thereof of limited surface area heated to a high temperature, the remaining portions being unheated or at most heated to a very much lower temperature except at the points where a change in direction of the conduit occurs. It is essential therefore that the heated portion of the conduit be so constructed as to insure that it will at all times be maintained at the proper temperature and this requires that this portion of the conduit be in heat conducting relation with a heat collector of considerable capacity for taking up the heat from the exhaust gases. It is also essential that the portion of the conduit leading from the heated zone be suitably insulated from the exhaust gases so as to prevent overheating of the mixture when the engine is operating at high speeds. In order to simplify the design of the manifold to provide a practical construction for manufacturing purposes, the heating jacket is arranged concentric of the riser section of the intake manifold and extends for a considerable length thereof. The heat collector is then arranged within the elongated jacket so as to distribute the mass of the metal and provide sufficient surface in contact with the heating medium. This heat collector, however, is spaced from the greater portion of the intake manifold so as to be insulated therefrom to the desired extent and as shown in Figure 3, this is accomplished by allowing the inner tube 27 to contact only with the ends of the heat collector 23 and having the remaining portions of the tube separated therefrom by an air space. In this construction also, the portion 25 of the heat collector is integral with the portion subjected to the exhaust gases and the entire member is formed of a material of high thermal conductivity, such as copper or aluminum.

In the modified arrangement as shown in Figure 6, the heat collector 23ª is made integral with the jacket 21ª and a separate bushing 25ª is inserted into heat conducting relationship therewith and arranged to form the heated section of the intake conduit. In this construction the bushing 25ª is preferably formed of copper, aluminum or other material of high conductivity, while the jacket and heat collector may have a relatively lower conductivity, such as is provided by cast iron. The heat collector 23ª has sufficient surface area to take up the necessary heat from the exhaust gases and the bushing 25ª being of the highest conductivity will insure a high temperature at the point where the explosive charge is deflected into contact therewith.

In Figure 7 the heat collector 23 is similar to that represented in Figure 3, but in this case the tubular member 27ª is composed of two separate spaced tubes 33 and 34 between which is inserted an insulating material 35 such as asbestos. This will insure a still lower temperature of the inner tube 33 forming the intake conduit. A further means for lowering the temperature of the inner tube 33 is brought about by providing port openings 36 and 37 through the walls of the tubes 33 and 34. This produces a vacuum between the tubular member 27ª and the heat collector 23 corresponding to the vacuum in the intake manifold. A much more effective insulation can be obtained when the air separating the heated portion from the intake is under a reduced pressure as it has been established that a very slight vacuum has a greater insulating effect than air under normal atmospheric pressure.

As has been stated before, the heated section of the intake has arranged therein a deflecting valve and in the construction shown in Figure 2, this valve also functions as the throttle of the engine and the usual throttle valve in the carburetor is dispensed with. In some carburetors, however, the throttle usually provided in the carburetor itself can not readily be eliminated because of the fact that its location in the carburetor is required in order to co-operate with the fuel feeding means. A carburetor of this type is diagrammatically represented in Figure 7 where 38 indicates the carburetor as a whole, 39 the Venturi passage, 40 the butterfly throttle valve, 41 the main jet below the throttle and 42 the low speed jet having its outlet opening adjacent the throttle and controlled thereby. In adapting my heater construction to an engine having such a carburetor, the separate heated riser section is also provided with a butterfly valve 43 located similarly to the throttle 28 previously described. The valves 40 and 43 are interconnected by suitable linkage 44 so as to operate simultaneously. Since the function of the member 43 is primarily to deflect the mixture against the heated section 25 of the manifold and the function of the member 40 is primarily to act as a throttle, it is preferable to have the deflector 43 set slightly ahead of the throttle 40 (for example three or four degrees ahead) so that the throttling effect is determined solely by the latter member and the carburetor functions in its normal manner.

It is not always necessary to have the upper throttle set ahead of the carburetor throttle, since the relative positions of these two members are determined by the character of co-operation between the carburetor throttle and the fuel feeding means. Therefore under some circumstances it may be desirable to have the linkage arranged so that the valve in the heated section is set behind the throttle in the carburetor. Such a construction is illustrated in Figure 11 where the butterfly member 40ª is slightly open when the deflector 43ª in the heated section is fully closed.

Figures 9 and 10 illustrate a modified arrangement for introducing the exhaust gases into the riser section. In this case the exhaust manifold 52 has its rear wall 53 continued straight across at the point connecting the three right hand cylinders with the three left hand cylinders. The front wall 54 curves forwardly and merges into the jacket 21 of the riser section and the walls are also elongated downwardly at 56 to form the required length of the heating chamber. 57 is a baffle plate extending transversely of the rear wall 53 and forming a deflector for compelling the exhaust gases from the three right hand cylinders to travel into the jacket 21 as indicated by the arrows on Figure 10. The baffle plate 57 is preferably secured to a rod 58, which in turn is mounted in bearings 59 in the manifold and provided with a lever 60 by which the baffle may be angularly adjusted. Thus by the adjustment of the pivoted baffle the gases may be more or less deflected into the riser section.

What I claim as my invention is:

1. In a throttle controlled internal combustion engine, the combination with an intake manifold, and a carburetor detachably connected thereto, of a chamber for heating fluid surrounding said intake conduit and spaced therefrom to insulate the greater portion of said intake conduit, a heat collector having an extended area of contact with the heating fluid in said chamber and having a direct thermal contact with a portion of said intake conduit of limited area, and a variable deflector arranged within said portion of limited area for deflecting the mixture into contact with the same.

2. In a throttle controlled internal combustion engine, a manifold construction adapted to be connected into the mixture passageway between the carburetor and the engine cylinder comprising a casing having outer and inner tubular walls forming an annular heating space therebetween, said inner wall having a portion of limited area forming the intake passageway, a tube within said inner wall and spaced from the same forming a portion of said intake passageway, a variable deflector arranged within said limited area portion of the intake passageway and means for operating said deflector from the throttle controlling means.

3. In a throttle controlled internal combustion engine, the combination with an annular heating chamber having outer and inner tubular walls, of an intake conduit within said inner tubular wall and spaced from the same to insulate the conduit from the heating chamber, said inner tubular wall forming a portion of said conduit lying flush with the walls thereof, thereby providing a heated surface exposed to the mixture in said conduit, and a deflector within the last mentioned portion of said conduit.

4. In an internal combustion engine, the combination with an intake conduit and an exhaust conduit, of a jacket surrounding said intake conduit forming an annular heating chamber, means for admitting exhaust gases into said heating chamber, a tubular heat collector within said heating chamber having one end thereof in heat conducting relation with a limited area of said intake conduit, and means for insulating the greater portion of said heat collector from the intake conduit within the same.

5. In an internal combustion engine, the combination with an intake conduit and heating means, of a heat collector surrounding said intake conduit and having an extended area exposed to said heating means, said heat collector being insulated from a large portion of said conduit enveloped thereby and being in heat conducting relation to a portion of limited extent, and means in said conduit for deflecting the mixture into contact with said portion of limited extent.

6. In an internal combustion engine, the combination of an intake conduit, a jacket surrounding said conduit, a heat collector between said jacket and said conduit, means for introducing heated fluid within said jacket into contact with a large extent of said heat collector, means for insulating said collector from one portion of said conduit located within said collector, another portion of said conduit of limited extent being in heat conducting relation with said heat collector, and a valve in said conduit arranged to deflect the mixture toward the heated portion of said conduit.

7. A heater for explosive charges comprising a body of high thermal conductivity having a portion of limited area forming part of the conduit for the explosive charge, means for heating said body, a separate member forming a continuatiton of said conduit, said member being enclosed by said body but spaced therefrom to prevent conduction of heat thereto, a bent conduit connected to said separate member, and means for heating the portion of the mixture thrown outwardly by inertia at the bend of said conduit.

8. A conduit for explosive charges having a straight portion and a bent portion, a heating jacket surrounding the straight portion and the outer wall only of the bent portion, a tubular member of high thermal conductivity within said jacket and spaced from said conduit, said member forming a heat collector and having a portion thereof of predetermined surface area forming a part of said conduit, means within said portion for deflecting the charge into contact with the heated surface, said means being automatically adjustable out of deflecting position in proportion to the amount of charge passing through said conduit.

9. In combination, a charge forming device having a mixture outlet and a heating element for heating the charge, said element having a wall forming a partition between an exhaust gas conduit and a charge conduit for the interchange of heat, a device in said heating element to deflect the charge towards said wall and by its movement vary the area of the interstice between it and said wall, throttling means in said mixture outlet which by its movement performs another function of carburetion, and means connecting said throttling means and said deflecting means for simultaneous movement whereby the unthrottled area of the mixture outlet of said charge forming device and the said interstice bear a prearranged relationship at all points of their joint excursion.

10. In combination, a carbureter having a mixture outlet, a heated conduit connected to said outlet, a valve in said heated conduit adapted to deflect the charge towards the hottest portion thereof and by its movement vary the effective area of said conduit, throttling means in said mixture outlet which by its movement performs another function of carburetion, and means connecting said throttling means and said deflecting valve for simultaneous movement whereby the unthrottled area of the mixture outlet and the effective area of said conduit bear a prearranged relationship at all points of their joint movement.

In testimony whereof I affix my signature.
CHARLES H. KIRBY.